A. R. MISKIN.
SPRING WHEEL.
APPLICATION FILED JULY 3, 1908.
941,329.
Patented Nov. 23, 1909.
2 SHEETS—SHEET 1.
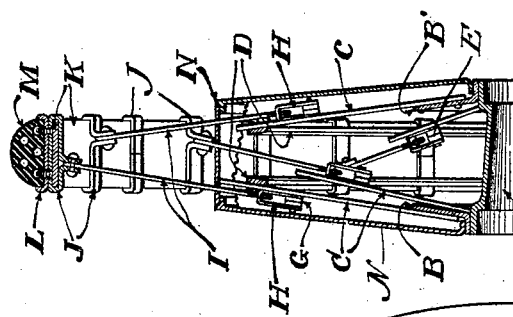
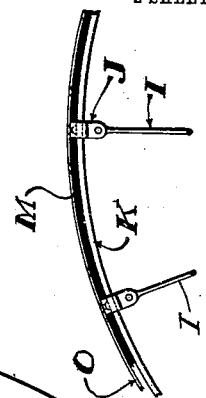
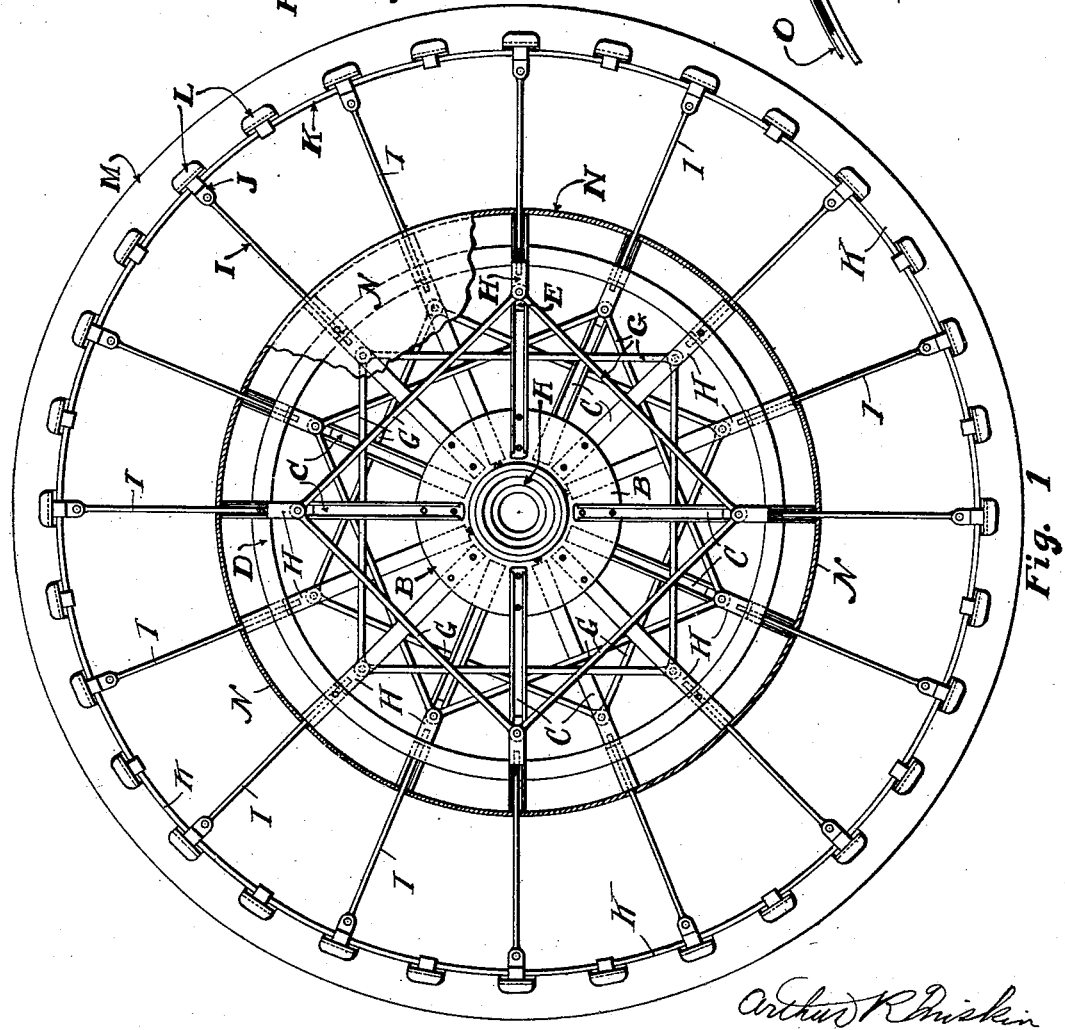
WITNESSES:
INVENTOR

A. R. MISKIN.
SPRING WHEEL.
APPLICATION FILED JULY 3, 1908.

941,329.

Patented Nov. 23, 1909.
2 SHEETS—SHEET 2.

WITNESSES:
Lewis Telle Cannon
A. A. Hontzell.

Arthur R Miskin
INVENTOR

UNITED STATES PATENT OFFICE.

ARTHUR R. MISKIN, OF IDAHO FALLS, IDAHO.

SPRING-WHEEL.

941,329.  Specification of Letters Patent.  Patented Nov. 23, 1909.

Application filed July 3, 1908. Serial No. 441,726.

*To all whom it may concern:*

Be it known that I, ARTHUR R. MISKIN, a citizen of the United States, residing at Idaho Falls, in the county of Bingham and State of Idaho, have invented new and useful Improvements in Spring-Wheels, of which the following is a specification.

My invention is an improved spring wheel for automobiles, bicycles, traction engines, and other vehicles. It is an improvement in that class of spring wheels having a flexible or elastic rim and provided with radial spokes attached to said rim and so connected with the hub, directly or indirectly, that the rim may change its form from circular to elliptical, when subjected to a load.

The details of construction, arrangement, and operation of parts are hereinafter described and illustrated in the accompanying drawing in which—

Figure 4:
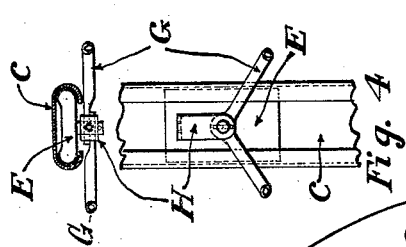
Figure 5:
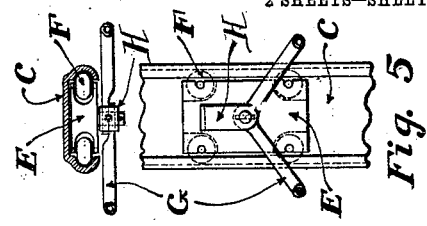
Figure 6:
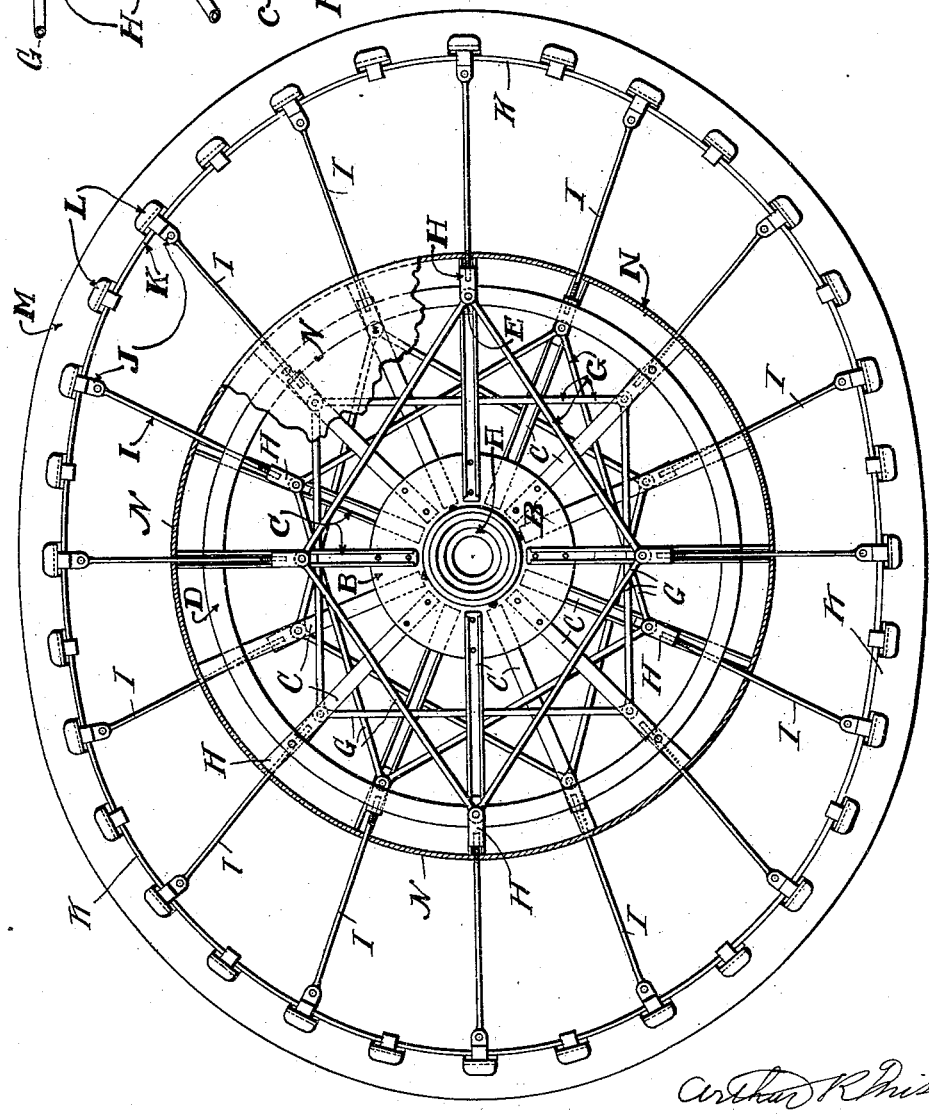

Figure 1 is in part a side, and in part a sectional, elevation of the wheel. Fig. 2 is a radial cross section of one-half of the wheel. Fig. 3 is a view illustrating the connection of the spokes with the flexible or elastic rim of the wheel. Fig. 4 includes a face view and cross section of the slidable bearing with which the inner ends of the spokes are connected. Fig. 5 is a similar view of a modification, in which the said bearing is provided with anti-friction rollers. Fig. 6 is a view similar to Fig. 1, save that the wheel is shown in the elliptical form which it assumes when sustaining a load.

The rim K of the wheel is formed of a flat steel band and to it is attached a rubber tire M, which may be perforated longitudinally as shown in Fig. 2. The attachment may be effected by clips L which are riveted to the rim K. A series of radial spokes I are attached to rim K by means of clips J, the connection between the spokes and the clips being a pivot, as shown in several views. The parts thus far described constitute the exterior portion of the wheel. The inner portion of the wheel is composed of the following parts. The hub H is provided with two annular flanges B, B' (see Fig. 2), the same being inclined toward each other at a slight angle, and their bases, which are in the form of a horizontal flange, being riveted to the hub. To these flanges B, B', are attached grooved bars C which are arranged radially as shown in Figs. 1 and 6. There are sixteen bars corresponding to the number of spokes, one bar being provided for each spoke. Four spokes are attached to the outer side of each of the flanges B, B', and four to the inner side thereof, and they have the same inclination as the flanges, toward each other, as shown in Fig. 2. Thus the bars C are divided into sets of four. Each spoke is attached to a stirrup-like device H which is connected with a block E adapted to slide in the bars C. As before stated, the bars C are arranged in sets of four. The blocks E which slide in such four bars are connected by rods G, which are of equal length, and, in the normal circular form of the wheel shown in Fig. 1 these bars form a square, or in other words, a rectangular parallelogram. The blocks of all the bars are similarly connected, as will be understood by reference to Figs. 1 and 6.

It will now be apparent that if a weight or load be sustained by the hub H, the elasticity of the rim K will allow the hub to sink and the rim thus become more or less elliptical, as shown in Fig. 6. In other words, the application of a load causes the flexible steel rim K to flatten on the upper and under side, while the opposite sides become more convex. In such operation, it is obvious that those blocks E which slide in those bars C that are vertical, move toward each other, while the blocks of the bars that are horizontal, or at right angles to the first-named ones, move outward, as shown in Fig. 6, this movement being due to the thrust of the bars G composing the parallelogram. Thus, as the wheel continues to revolve, its elliptical form will be maintained as the load is borne successively by the spokes I. Thus, the several rectangular parallelograms illustrated in Fig. 1, become successively oblique parallelograms or rhombi, as shown in Fig. 6.

In order to brace and stiffen the spoke guides C, their outer portions are connected by rings D as shown in Figs. 1, 2, 6. A metal casing N is provided for the parts immediately surrounding or connected with the hub, mainly for the purpose of excluding dust and dirt and also for protecting the inclosed parts from contact with exterior objects. As shown in Fig. 2, the sides of the casing incline toward each other corresponding in essentials to the parts B', C, and I, which it incloses. The spokes I slide through openings in the periphery of the casing.

It is obvious that if the wheel meets an obstruction in the course of its rotation, a jar otherwise incident thereto will be mainly taken up and the wheel flattened more or less as it rolls over the obstruction. The wheel will, therefore, take up jolts, jars, or vibrations which are incident to wheels constructed in the ordinary manner, and thus not only is the vibration of any part of the vehicle lessened, but injury to the pneumatic or other tires is correspondingly lessened.

What I claim is:

1. The improved spring wheel comprising a hub, an elastic rim, a series of radial spokes attached thereto, a series of radial guides rigidly connected with the hub and serving as guides for the inner ends of the spokes, and bars connecting the ends of spokes which are at right angles to each other with each other, substantially as described.

2. The improved spring wheel comprising a hub, an elastic rim, radial spokes attached thereto, a series of bars radiating from the hub and corresponding with the spokes in number and position, devices with which the inner ends of the spokes are connected and which slide on such bars, rods having a jointed connection with said devices and arranged in the form of a parallelogram which is normally rectangular, but which becomes oblique when subjected to pressure, substantially as described.

3. The improved spring wheel comprising a hub, an elastic rim, radial spokes having a pivotal connection with the rim, radial guide bars rigidly connected with the hub and corresponding with the spokes in number and position, blocks adapted to slide in said guide bars and connected with the spokes, and a series of bars connecting the blocks in sets of four, and forming normally a rectangular parallelogram which becomes oblique when the wheel sustains a load or meets an obstruction, as shown and described.

4. In a spring wheel of the type indicated, the combination with the hub and annular flanges secured thereto, of grooved bars rigidly attached to said flanges and arranged in radial position, a ring attached to their outer ends whereby they are rigidly connected, blocks adapted to slide in said bars, rods connecting the blocks in series of four and forming a rectangular parallelogram, spokes connected with the said blocks, and an elastic rim to which the outer ends of the spokes are pivotally attached, as shown and described.

5. In a wheel of the type indicated, the combination with the hub and bars rigidly connected therewith and provided with lateral grooves, of blocks provided with antifriction rollers which are adapted to run in the grooves of said bars, bars connecting the blocks in series of four and arranged to form normally a rectangular parallelogram, an elastic rim, and spokes connecting it with the aforesaid blocks, as and for the purpose specified.

In testimony whereof I affix my signature, in presence of two subscribing witnesses.

ARTHUR R. MISKIN.

Witnesses:
LEWIS TELLE CANNON,
A. A. HENTZELL.